(12) United States Patent
Chang

(10) Patent No.: US 8,350,171 B2
(45) Date of Patent: Jan. 8, 2013

(54) FUNCTION SWITCH ON HANDLE OF MOTORCYCLE

(75) Inventor: Yao-Jen Chang, Tainan (TW)

(73) Assignees: Hau Ju Enterprise Co., Ltd., Tainan (TW); Hollister Holdings Inc., Gilroy, CA (US)

( * ) Notice: Subject to any disclaimer, the term of this patent is extended or adjusted under 35 U.S.C. 154(b) by 320 days.

(21) Appl. No.: 12/783,852

(22) Filed: May 20, 2010

(65) Prior Publication Data
US 2011/0284349 A1 Nov. 24, 2011

(51) Int. Cl.
*H01H 9/00* (2006.01)
(52) U.S. Cl. ....................................................... 200/312
(58) Field of Classification Search .................. 200/310, 200/308, 312, 315, 61.88, 18, 329, 339, 553, 200/561–563, 61.27, 61.54, 61.57, 61.85, 200/61.87
See application file for complete search history.

(56) References Cited

U.S. PATENT DOCUMENTS

| | | | | |
|---|---|---|---|---|
| 3,743,805 A | * | 7/1973 | Guinan | 200/315 |
| 4,347,417 A | * | 8/1982 | Sorenson | 200/433 |
| 4,436,972 A | * | 3/1984 | Scanlon | 200/315 |
| 4,847,454 A | * | 7/1989 | Hiruma | 200/61.85 |
| 6,225,584 B1 | * | 5/2001 | Ase et al. | 200/61.54 |
| 7,560,656 B2 | * | 7/2009 | Okatani et al. | 200/559 |

* cited by examiner

*Primary Examiner* — Edwin A. Leon
(74) *Attorney, Agent, or Firm* — Rosenberg, Klein & Lee

(57) ABSTRACT

This invention relates to a function switch on handle of motorcycle, in which a light transmissive zone is formed on the housing thereof. A light emitting source is provided at the interior of the function switch which is coupled to the switches for small light and large light. In this manner, when driver turns on small light or large light, the light emitting source can also be energized to radiate light and the light beam emitted from the light emitting source can be projected out through the light transmissive zone of the housing so as to highlight the pattern of the light transmissive zone.

11 Claims, 8 Drawing Sheets

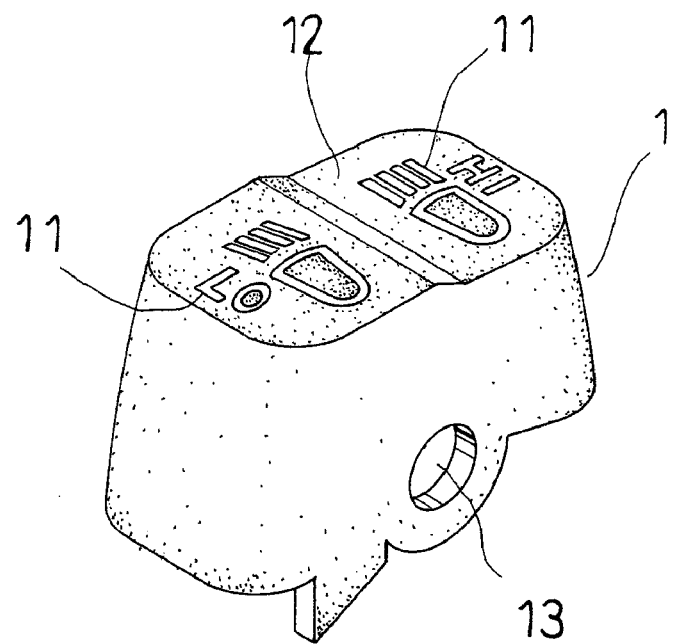
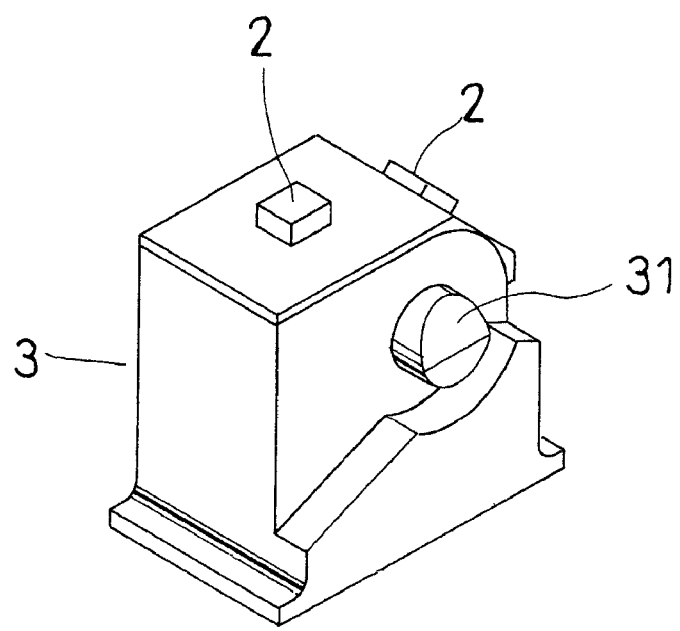
FIG. 1

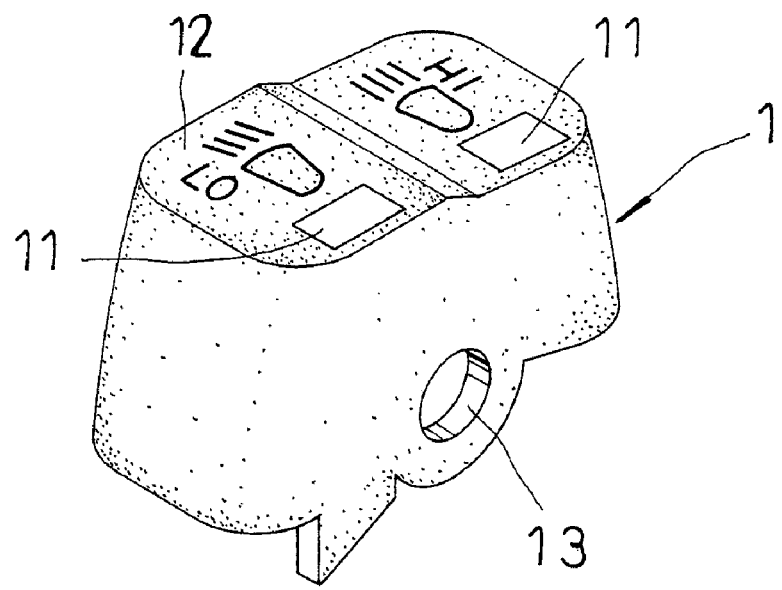
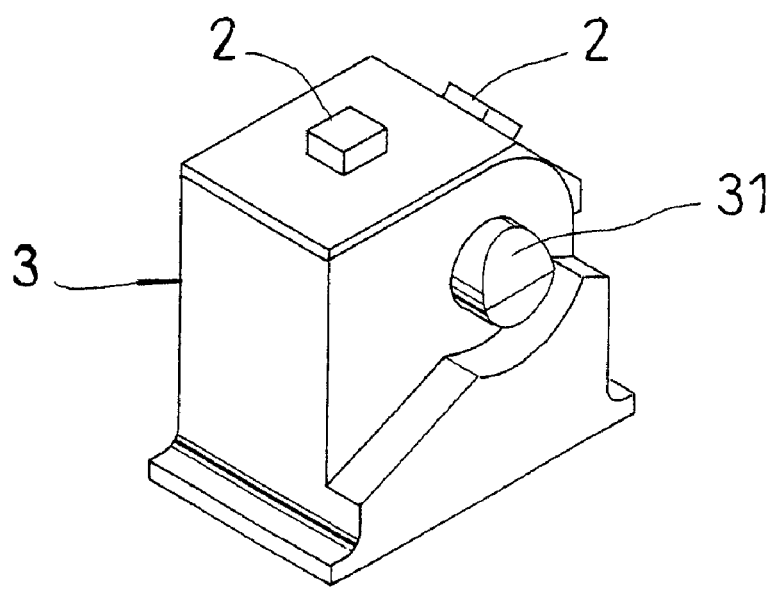
FIG. 7

FUNCTION SWITCH ON HANDLE OF MOTORCYCLE

BACKGROUND OF THE INVENTION

1. Field of the Invention

The present invention relates to a function switch on handle of motorcycle, more particularly to a novel function switch on handle of motorcycle in which a light transmissive zone formed on the housing of the function switch and a light emitting source installed in the interior of the function switch are provided in such a manner that the light beam, when generated from the light emitting source, can be displayed on the light transmissive zone so as to highlight the pattern on the light transmissive zone.

2. Brief Description of the Prior Art

In order that driver can make distinction between the functions of the switch mounted on the handle of motorcycle, indication patterns are usually printed on the surface of the function switch. However, as the indication patterns printed on the surface of the function switch often loses the action as function indicator at dim light place or at night, driver of motorcycle can only judge the position of each function switch according to his direct sense. Certainly, this often causes inconvenience and persecution in usage.

Hence, related industry has developed a function switch enabling to emit light for display at dim light place or at night, which can be referred to a new utility model disclosed in the Taiwanese Patent Gazette No. 553134 entitled "Motor switch having a light emitting body served as indication lamp", in which a groove is provided in the interior of a control switch assembled on a mounting seat, a light emitting body lamp being disposed within the groove, and a closure cap made of transparent material having indication patterns provided thereon being fitted over the groove, a power cord being connected from the light emitting body lamp to the battery and headlight switch so as to control the ON-OFF of the light emitting body lamp by the headlight switch. In this manner, when the headlight is turned on in dim light condition, the light emitting body lamp is simultaneously energized to illuminate the indication patterns provided on the closure cap so as to allow the driver see clearly the position and function of each control switch to guarantee the safety in driving.

However, inasmuch as the fitting between the closure cap and the groove is accomplished by adhesive, supersonic welding or snap-fit, gap is easily produced on the joint seam between the closure cap and the groove so that a fully hermetic space cannot be formed in the groove. In this case, rain is liable to permeate into the groove to cause short circuit or even damage of the light emitting body lamp disposed in the groove. Furthermore, in the case of replacing the damaged light emitting body lamp, if the fitting between the closure cap and the groove is accomplished by adhesive or supersonic welding, the closure cap cannot be removed from the top of the groove such that maintenance becomes hindered and difficult. In addition, the indication patterns printed on the surface of the closure cap is easily peeled off in the course of time and the indication patterns are opaque or at most transmissive in some periphery, the indication effect and quality feeling are not that good.

SUMMARY OF INVENTION

Thus, if there is a function switch the function indication patterns of which are clearly to be recognized even at dim light place or at night, and the light emitting source of which is ensured to avoid moisture, to be convenient on maintenance and to avoid peel-off of the indication patterns, the disadvantages of the conventional function switch can be remarkably improved.

The main purpose of the present invention is to provide a function switch on handle of motorcycle, the indication patterns of which can clearly be seen by driving a light emitting source to radiate light even at dim light place or at night, so as to facilitate the operation of switch for motorcyclist. Furthermore, the function switch on handle of motorcycle of the present invention has the advantages of avoiding moisture, convenience on maintenance and of avoiding peel-off of the indication patterns.

In order to achieve above object, this invention provides a function switch of handle of motorcycle, in which a light transmissive zone is formed on the housing of the function switch, a light emitting source being provided in the interior of the function switch which is coupled to the switches for small light and large light. In this manner, when motorcyclist turns on small light or large light, the light emitting source can be energized simultaneously to radiate light and the light beam emitted from the light emitting source can be projected out through the light transmissive zone of the housing so as to highlight the pattern of the light transmissive zone.

According to the present invention, the light emitting source is fixed in a groove provided in the inner face of the housing and opposite to the light transmissive zone.

According to the present invention, the light emitting source is fixed on a mounting seat pivotally linked with and enclosed by the housing.

BRIEF DESCRIPTION OF ACCOMPANYING DRAWINGS

FIG. 1 is a perspective exploded view showing the function switch of the present invention.

FIG. 7 is a perspective exploded view showing the function switch of another embodiment of the present invention.

DETAILED DESCRIPTION OF PREFERRED EMBODIMENT

The objects, the technical contents and the expected effect of the present invention will become more apparent from the detailed description of the preferred embodiments in conjunction with the accompanying drawings.

Figure 2:
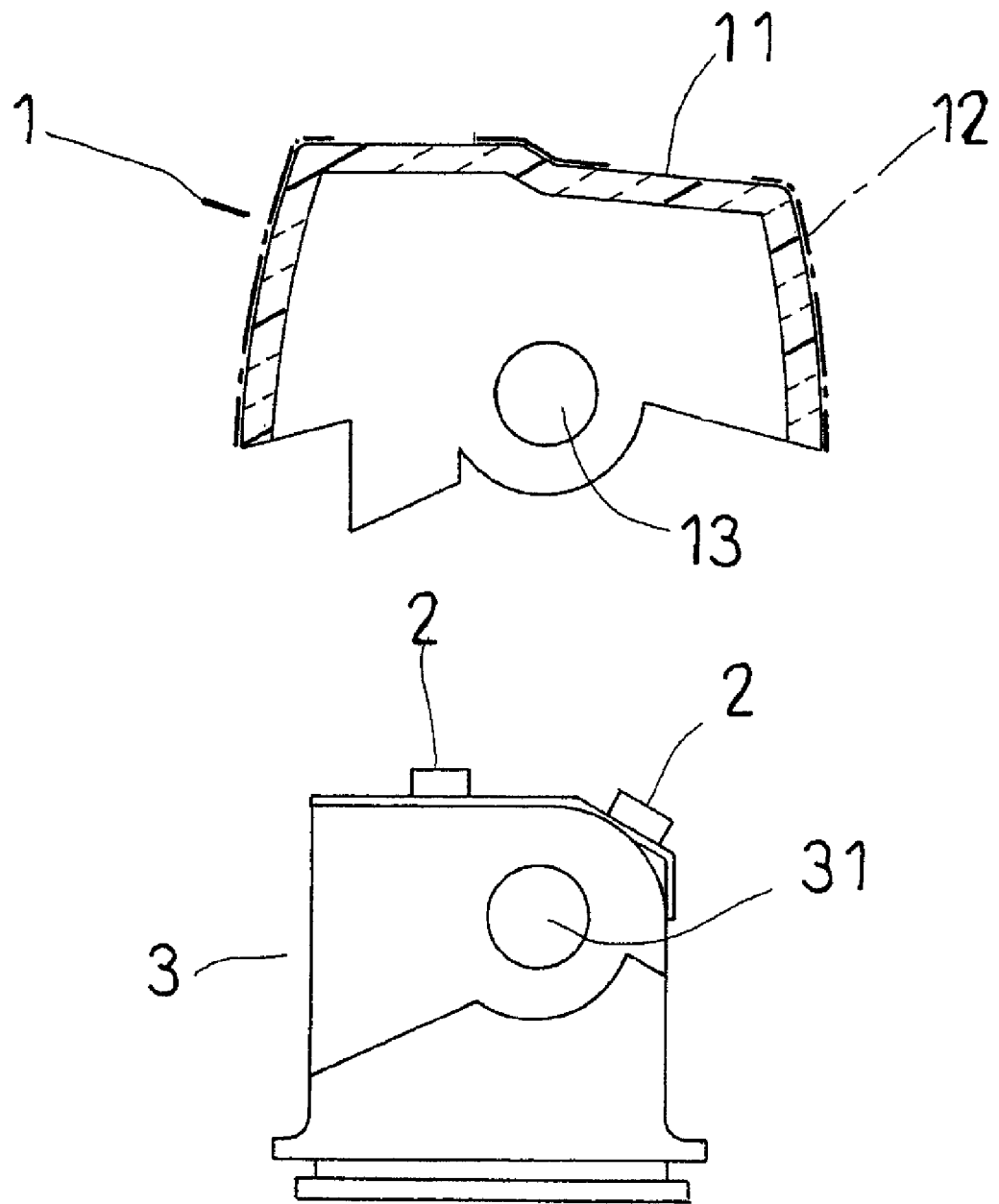
FIG. 2 is a side exploded view showing the function switch of the present invention.
Figure 3:
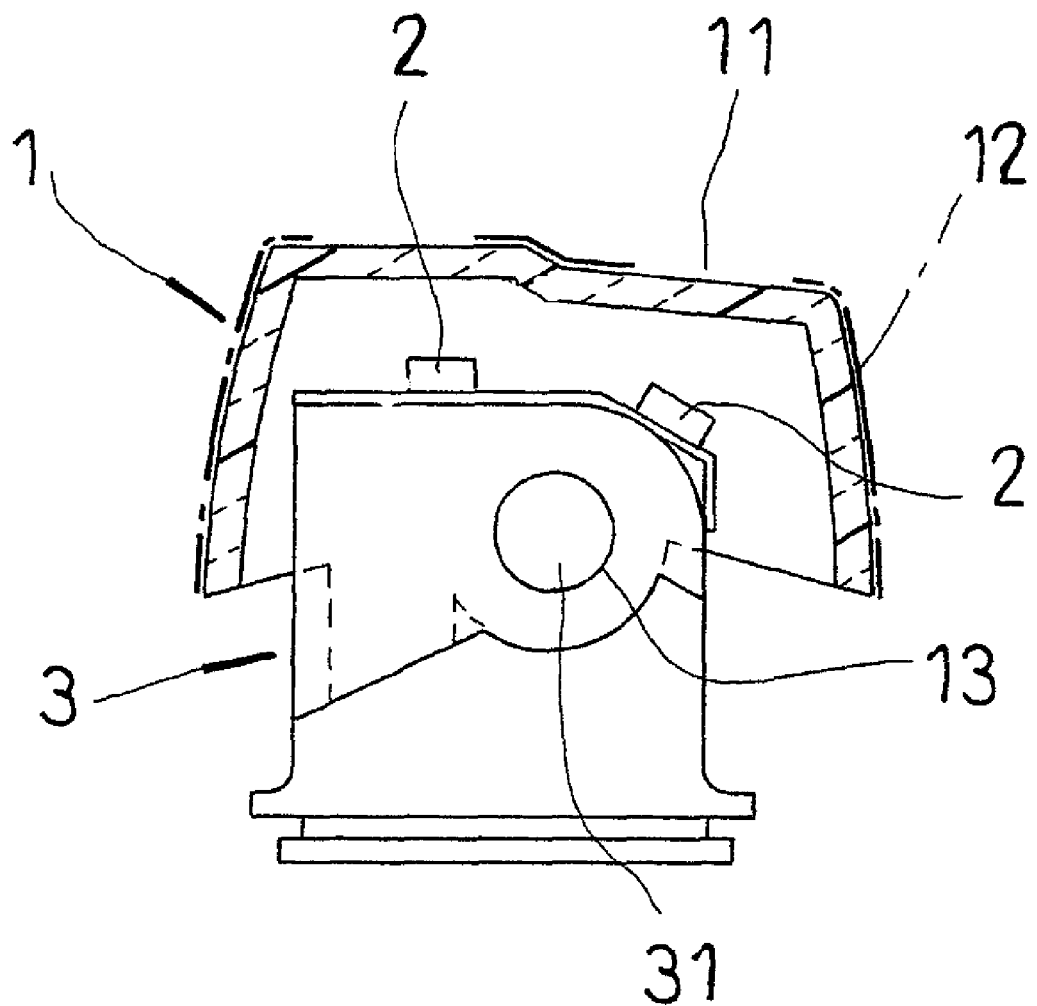
FIG. 3 is a side assembled view showing the function switch of the present invention.

Referring to FIGS. 1 and 3, the function switch on handle of motorcycle of the present invention comprises a housing (1) and a light emitting source (2).

The housing (1) is a hollow shell-like body and a light transmissive zone (11) is provided on the end face showing the functions of the function switch. At least one light emitting source (2) is provided in the interior of the housing (1), which is coupled to a circuit for driving small light and large light, not shown in figures.

In this way, when driver turns on small light and large light of motorcycle, the light emitting source (2) can be energized simultaneously to radiate light and the light beam emitted from the light emitting source (2) is projected out through the light transmissive zone (11) of the housing (1) so as to highlight the pattern of the light transmissive zone (11).

According to the present invention, the abovementioned light transmissive zone (11) is either:

a pattern or characters for indicating a function, such as low-beam or high-beam indication pattern or characters, horn indication pattern or characters, direction light indication pattern or characters as shown in FIGS. 1 to 6, or:

simply a lamp located beside function indication patterns which is illuminated to highlight the function status just now as shown in FIG. 7.

In order to form the light transmissive zone (11), an opaque light-shielding layer (12) is firstly formed on the surface of the housing (1) having light transmittancy by varnish-baking method, then a part of the light-shielding layer (12) is removed by laser beam so as to form the light transmissive zone (11). Alternatively, shading papers having indication patterns provided thereon are firstly adhered on the surface of the housing (1) having light transmittancy, then varnish-baking treatment is conducted on the surface of the housing (1). In turn, shading papers are torn apart from the surface so that a light transmissive zone (11) having indication patterns can be formed on the surface of the housing (1).

According to the present invention, the light emitting source (2) is a LED, and the light emitting source (2) can be further installed on a mounting seat (3) which is pivotally linked together with the housing (1).

The mounting seat (3) has pivotal stub shafts (31) provided on both sides. The pivotal stub shafts (31) of the mounting seat (3) are engaged in pivot holes (13) provided on both sides of the housing (1) so as to achieve the pivotal linking of the housing (1) to the mounting seat (3).

Figure 8:
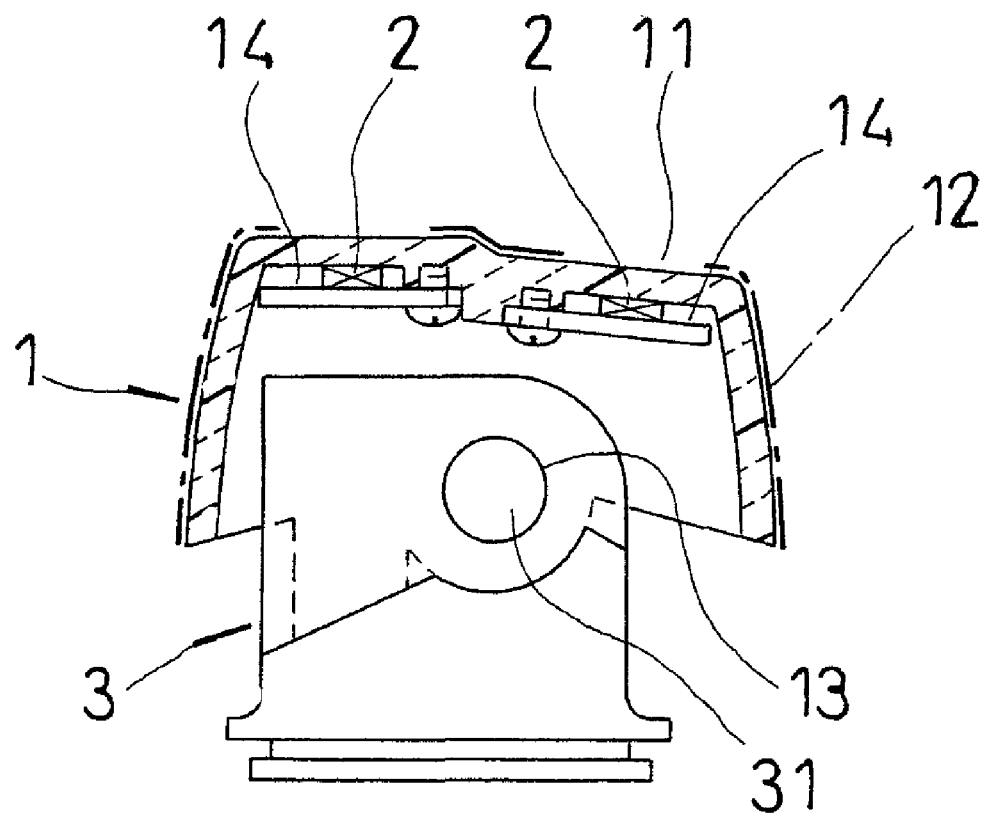
FIG. 8 is a side assembled view showing the function switch of another embodiment of the present invention.

Referring to another embodiment of the present invention shown in FIG. 8, a groove (14) arranged opposite to the light transmissive zone (11) is provided on the inner face of the housing (1). The light emitting source (2) is fixed in the groove (14) provided on the inner face of the housing (1).

Figure 4:
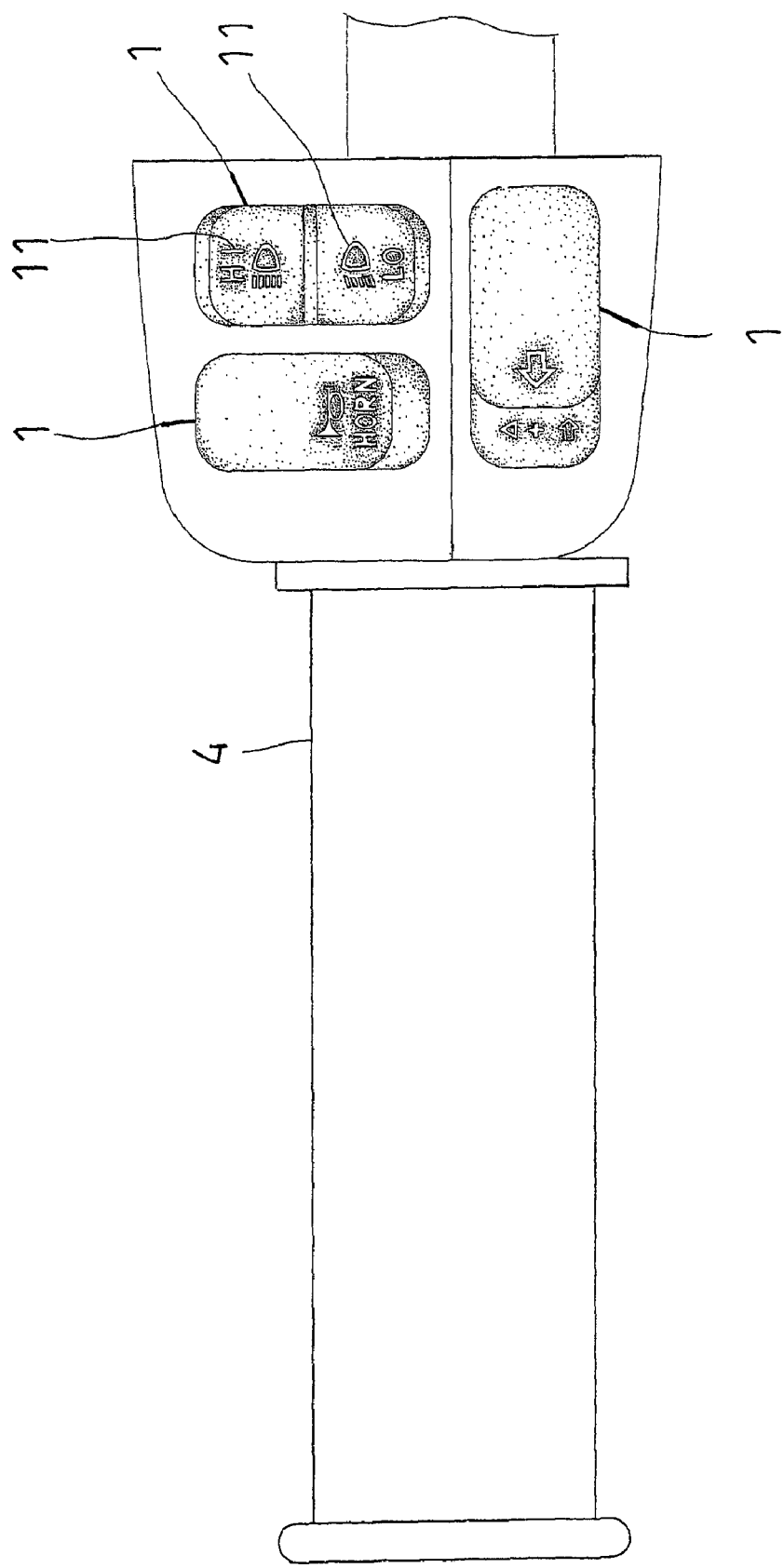
FIG. 4 is a top schematic view showing the function switch of the present invention assembled on the handle of motorcycle.
Figure 5:
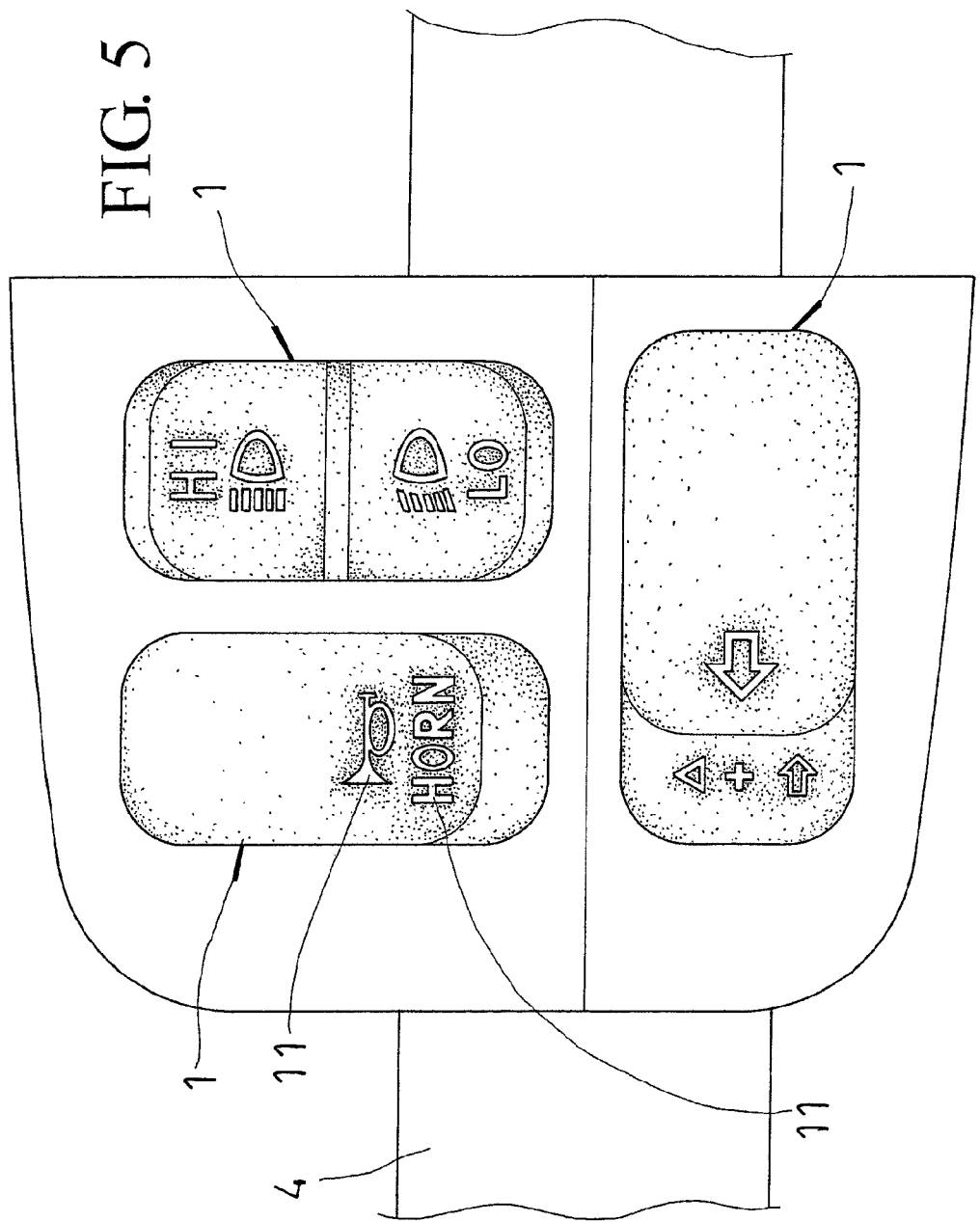
FIG. 5 is a top enlarged view showing the function switch of the present invention assembled on the handle of motorcycle.
Figure 6:
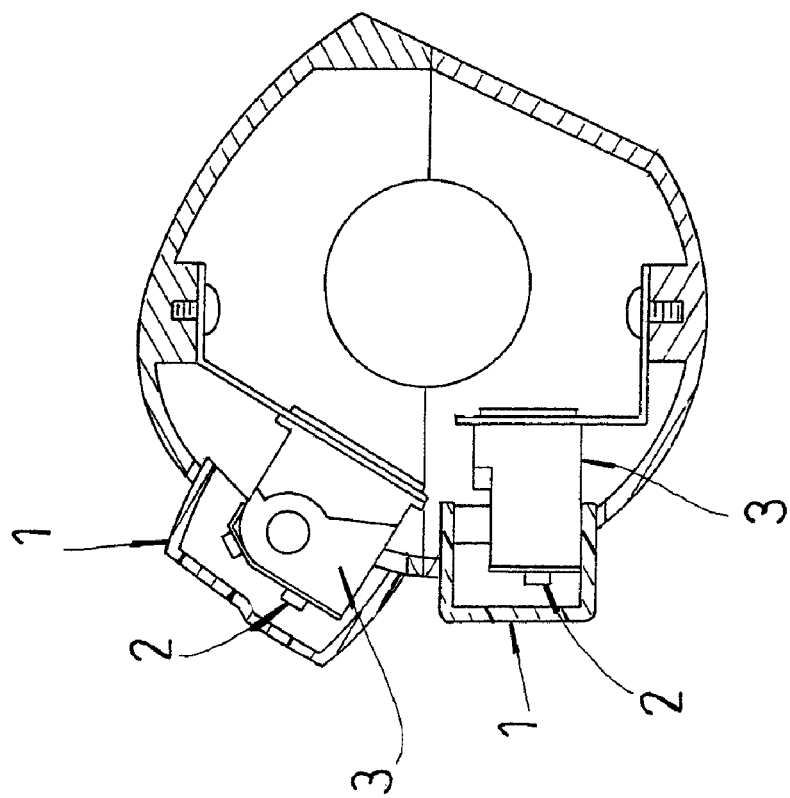
FIG. 6 is a side schematic view showing the function switch of the present invention assembled on the handle of motorcycle.

Further, the function switch of the present invention is installed on the handle (4) of motorcycle, as shown in FIGS. 4 and 5.

What is claimed is:

1. A function switch of handle of motorcycle, comprising a housing pivotally coupled to a mounting seat, wherein said housing defines a shell-like body covering to substantially enshroud an outer portion of said mounting seat, predetermined indicia defined by a patterned light transmissive zone being provided on said housing, and at least one light emitting source being provided in the interior of said housing over said outer portion of said mounting seat.

2. The function switch of handle of motorcycle as claimed in claim 1, wherein said light transmissive zone is an assembly of one or both of function indication patterns and characters.

3. The function switch of handle of motorcycle as claimed in claim 2, wherein said light emitting source is installed on said mounting seat.

4. The function switch of handle of motorcycle as claimed in claim 3, wherein said mounting seat and said housing are pivotally linked together with said housing being displaceable relative to both said mounting seat and light emitting source.

5. The function switch of handle of motorcycle as claimed in claim 4, wherein said mounting seat has pivotal stub shafts provided on both sides thereof, said pivotal stub shafts of said mounting seat being engaged in pivot holes provided on both sides of said housing.

6. The function switch of handle of motorcycle as claimed in claim 2, wherein said groove arranged opposite to said light transmissive zone is provided on the inner face of said housing, said light emitting source being fixed in said groove provided on the inner face of said housing.

7. The function switch of handle of motorcycle as claimed in claim 1, wherein said light transmissive zone is located beside a function indication patterns or characters.

8. The function switch of handle of motorcycle as claimed in claim 7, wherein said light emitting source is installed on said mounting seat.

9. The function switch of handle of motorcycle as claimed in claim 8, wherein said mounting seat and said housing are pivotally linked together with said housing being displaceable relative to both said mounting seat and light emitting source.

10. The function switch of handle of motorcycle as claimed in claim 9, wherein said mounting seat has pivotal stub shafts provided on both sides thereof, said pivotal stub shafts of said mounting seat being engaged in pivot holes provided on both sides of said housing.

11. The function switch of handle of motorcycle as claimed in claim 7, wherein said groove arranged opposite to said light transmissive zone is provided on the inner face of said housing, said light emitting source being fixed in said groove provided on the inner face of said housing.

* * * * *